United States Patent
Dama et al.

(10) Patent No.: US 9,961,699 B2
(45) Date of Patent: May 1, 2018

(54) METHOD FOR ACCESSING A CHANNEL IN A WIRELESS COMMUNICATION NETWORK

(71) Applicant: INDIAN INSTITUTE OF TECHNOLOGY HYDERABAD, Hyderabad (IN)

(72) Inventors: Sreekanth Dama, Hyderabad (IN); Thomas Velerrian Pasca Santhappan, Hyderabad (IN); Abhinav Kumar, Hyderabad (IN); Kiran Kumar Kuchi, Hyderabad (IN); Bheemarjun Reddy Tamma, Hyderabad (IN); Uday Babulal Desai, Hyderabad (IN)

(73) Assignee: INDIAN INSTITUTE OF TECHNOLOGY HYDERABAD, Andhra Pradesh (IN)

( * ) Notice: Subject to any disclaimer, the term of this patent is extended or adjusted under 35 U.S.C. 154(b) by 67 days.

(21) Appl. No.: 15/018,571

(22) Filed: Feb. 8, 2016

(65) Prior Publication Data
US 2016/0242175 A1 Aug. 18, 2016

(30) Foreign Application Priority Data
Feb. 12, 2015 (IN) .............................. 689/CHE/2015

(51) Int. Cl.
*H04W 74/08* (2009.01)

(52) U.S. Cl.
CPC .................................. *H04W 74/08* (2013.01)

(58) Field of Classification Search
USPC .......................................................... 370/315
See application file for complete search history.

(56) References Cited

U.S. PATENT DOCUMENTS

| | | | | |
|---|---|---|---|---|
| 2002/0065994 | A1* | 5/2002 | Henson | G06F 3/0613 711/151 |
| 2002/0154653 | A1* | 10/2002 | Benveniste | H04L 12/4013 370/447 |
| 2006/0046647 | A1* | 3/2006 | Parikh | H04B 7/155 455/11.1 |
| 2016/0242175 | A1* | 8/2016 | Dama | H04W 74/08 |

OTHER PUBLICATIONS

University of Southern California Information Sciences Institute. The Network Simulator—ns—2. <https://web.archive.org/web/20140109190009/https://www.isi.edu/nsnam/ns/>, Jan. 9, 2014.*

* cited by examiner

*Primary Examiner* — Min Jung

(57) ABSTRACT

Embodiments herein disclose a method and a base station for accessing a channel of an unlicensed band in a wireless communication network. The method includes maintaining a plurality of virtual stations by the base station in the wireless communication network based on a value. Further, the method includes contending to access the channel using the plurality of virtual stations. Each virtual station in the plurality of virtual stations includes a contention window and a counter value.

20 Claims, 5 Drawing Sheets

100

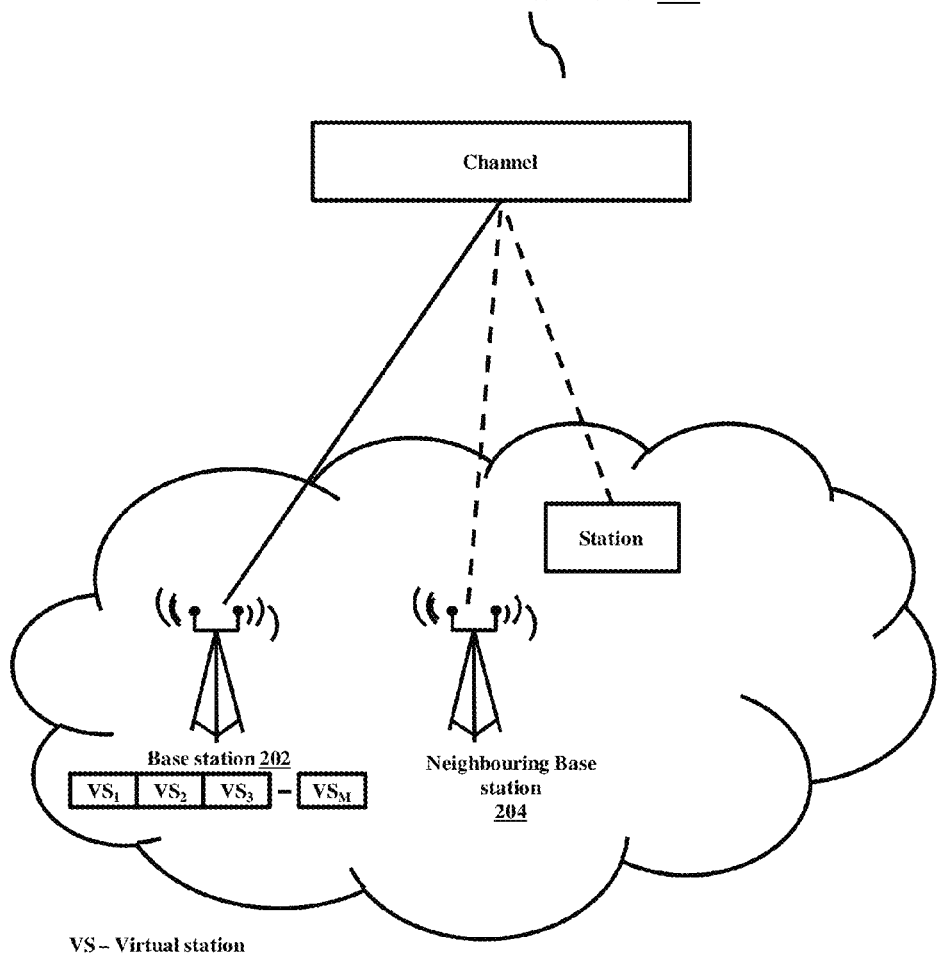

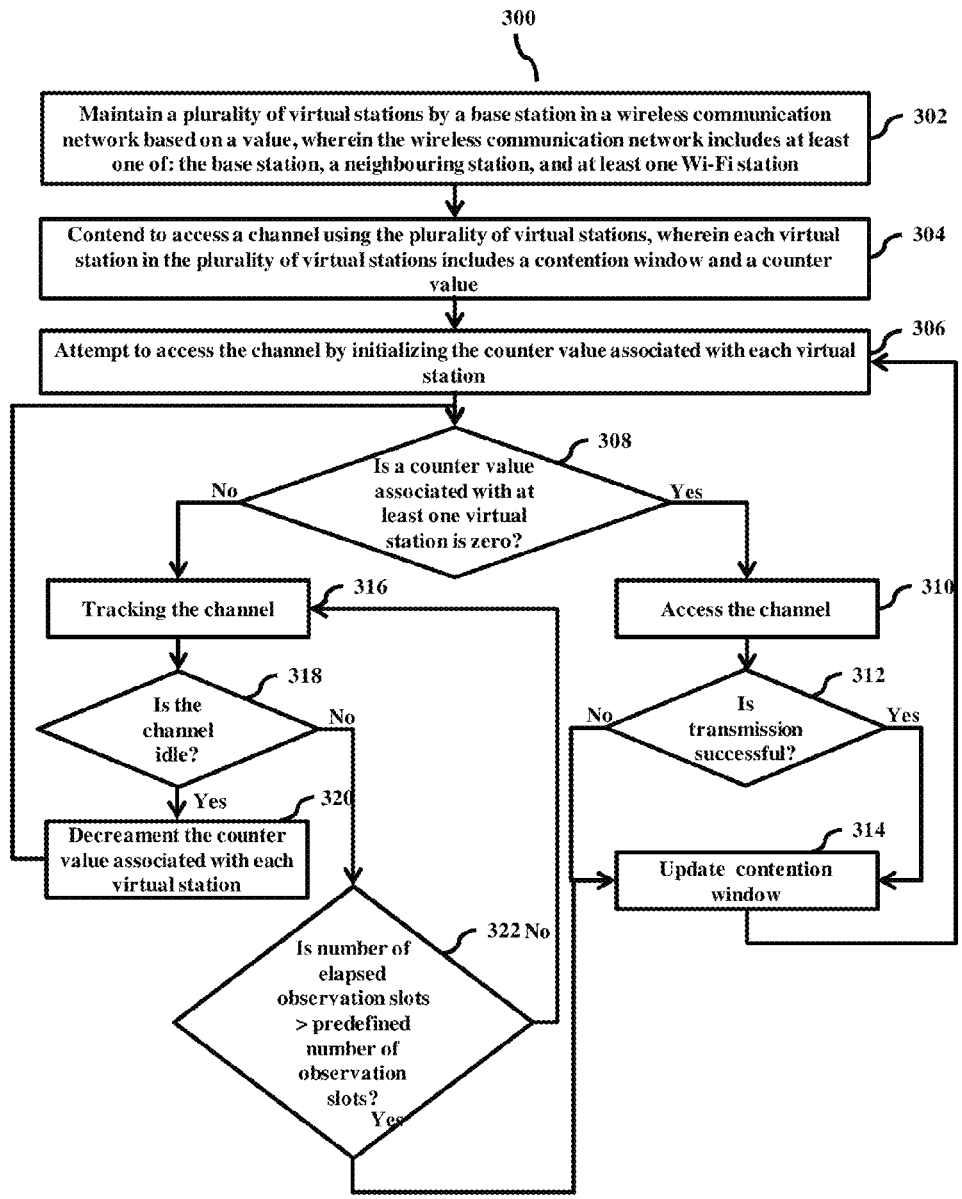

METHOD FOR ACCESSING A CHANNEL IN A WIRELESS COMMUNICATION NETWORK

TECHNICAL FIELD

The embodiments herein relate to wireless communication networks and more particularly relates to channel access mechanism for accessing unlicensed bands. The present application is based on, and claims priority from an Indian Application Number 689/CHE/2015 filed on 12 Feb. 2015, the disclosure of which is hereby incorporated by reference herein.

BACKGROUND

Recently, the third generation partnership project approved a study (3GPP TD RP-141664: "Study on Licensed-Assisted Access using Long Term Evolution (LTE)" to evaluate the LTE enhancements for Licensed Assisted Access (LAA) to an unlicensed spectrum. The objective of the 3GPP study is to define evaluation methodologies and deployment scenarios for the LTE deployments focusing on a LTE carrier aggregation and identifying enhancements to the LTE; meeting the requirements and targets for the unlicensed spectrum deployments. Further, the study proposes that a Base Station (BS) can use the unlicensed spectrum through the carrier aggregation. In the study, 3GPP has come up with dynamic channel access strategies to access the unlicensed spectrum.

In existing systems, IEEE 802.11 wireless LAN (WLAN) stations operate on an unlicensed band and Distributed Coordination Function (DCF) is the basic mode of operation for accessing the channel. The DCF provides a fair access to all 802.11 stations by doing a channel sensing before transmission with an exponential back off. The mechanism is known as Carrier Sense Multiple Access with Collision Avoidance (CSMA/CA). Further, the channel sensing ensures that no other 802.11 station is transmitting in the channel (i.e., to avoid direct collision) and the exponential back off ensures that the opportunity of getting the channel is shared evenly among all stations.

For example, consider the 802.11 WLAN where "M" stations have to communicate by using the DCF procedure. For simplicity, 4 stations are shown in the FIG. 1a. As shown in the FIG. 1a, packet arrival to a Media Access Control (MAC) can happen at any time. The station (i.e., station 1 as shown in the FIG. 1a) wants to transmit performs a Clear Channel Assessment (CCA) for a DCF inter frame space (DIFS) time. If the channel is idle then, the station will choose a random number (i.e., back off counter) "N" as the back off time slots from 0 to Contention Window (CW). The CW is initially taken as equal to a minimum contention window (CW_MIN). The back off counter "N" is decremented by one every time the channel is idle for slot duration. In case when the stations determine that the channel is busy before the back off counter "N" becomes zero then, the stations will not alter the back off counter "N". After the next DIFS time, the stations will decrement the counter from the last value, instead of choosing a new one. When the back off counter $N_i$ reaches zero then the station, (i.e., $STA_i$) transmits its frames by accessing the channel. In the FIG. 1a, the station 1 transmits after the back off counter becomes zero.

In other existing systems, Listen before Talk (LBT) is a channel access process followed in the unlicensed bands. The channel is observed for a fixed amount of time. At the end of the observation time, decision to transmit or occupy the channel is determined based on the channel being idle or busy. Thus, ensuring that the station that wants to transmit does not interfere (i.e., avoid a collision) with another station that is already occupied the channel.

In other existing systems, Load Based Equipment (LBE) implements an LBT based spectrum sharing mechanism based on the CCA mode using "energy detect". The LBE can utilize any of the following two mechanisms i.e., fixed back off or exponential back off, before occupying the unlicensed spectrum.

In the exponential back off, the CCA is performed before the transmission. At least for a time period of 20 μs, the channel should be idle. In case the energy level in the channel is above the pre-determined threshold within the CCA time then the channel is considered as busy. The station which determines the channel to be busy will not do any transmission, instead it will perform an Extended CCA (ECCA) mechanism in which the channel is observed for "$Q_i$" observation slots (i.e., an observation slot can be an unoccupied idle slot of 18 μs (ECCA slot time) or a busy slot). The busy slot is the total time in which the channel was found occupied in between two unoccupied ECCA slots and it should be considered as the single observation slot.

In the fixed back off, the ECCA should be carried out in the channel for the observation period which is the random number $N_i$ multiplied by the CCA observation time of 20 μs, where $N_i$ is the number of unoccupied idle slots that are required to be observed before initiating the transmission. The value of $N_i$ is randomly selected in the range 1 to "$Q_i$" every time the ECCA is required and the value is stored in a counter. The value of "$Q_i$" is selected by the manufacturer in the range 4 to 32. The counter is decremented every time the CCA slot is considered to be unoccupied. Whenever the counter reaches zero, the station may occupy the channel.

The above information is presented as background information only to help the reader to understand the present invention. Applicants have made no determination and make no assertion as to whether any of the above might be applicable as Prior Art with regard to the present application.

SUMMARY

Embodiments herein disclose a method to access a channel of an unlicensed band in a wireless communication network. The method includes maintaining a plurality of virtual stations by the base station in the wireless communication network based on a value. The wireless communication network includes any one of the base station, a neighboring base station, and one or more Wi-Fi stations. Further, the method includes contending with one of the neighboring base station and the Wi-Fi stations to access the channel using the plurality of virtual stations. Each virtual station in the plurality of virtual stations includes a contention window, and a counter value.

Embodiments herein disclose a base station for accessing a channel of an unlicensed band in a wireless communication system. The base station configured to maintain a plurality of virtual stations in the wireless communication network based on a value. The wireless communication network includes any one of the base station, a neighboring base station, and one or more Wi-Fi stations. Further, the base station configured to contend with one of the neighboring base station and the Wi-Fi stations to access the channel using the plurality of virtual stations. Each virtual station in the plurality of virtual stations includes a contention window, and a counter value.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which:

FIG. 2a illustrates generally, among other things, a high level overview of a wireless communication network for accessing a channel, according to embodiments as disclosed herein;

FIG. 3 is a flow diagram illustrating a method for accessing a channel in the wireless communication network, according to embodiments as disclosed herein.

DETAILED DESCRIPTION OF INVENTION

Figure 1:
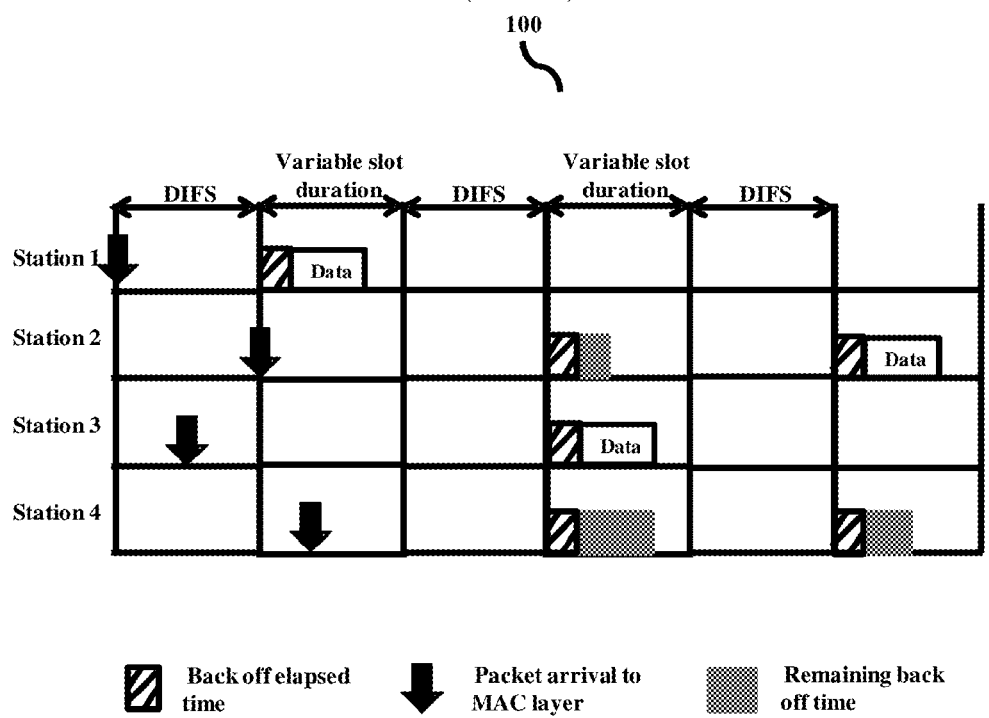
FIG. 1 illustrates an example Distributed Coordination Function (DCF) used in IEEE 802.11.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Throughout the description, the terms Wi-Fi and IEEE 802.11 WLAN are used inter-changeably.

The embodiments herein disclose a method for accessing a channel by the base station in a wireless communication network. The method includes maintaining a plurality of virtual stations by the base station in the wireless communication network based on a value.

In an embodiment, multiple channels are available in the unlicensed band.

In an embodiment, the wireless communication network includes only the base station. In another embodiment, the wireless communication network includes the base station, a neighboring base station, and one or more Wi-Fi stations.

Further, the method includes contending to access the channel using the plurality of virtual stations. In an embodiment, each virtual station in the plurality of virtual stations includes a contention window and a counter value.

In an embodiment, the method includes initializing the counter value associated with each virtual station when the base station attempts to access the channel. The counter value is selected based on the contention window. In an embodiment, the method includes determining whether the counter value associated with the virtual station is zero. Further, the method includes accessing the channel by the base station after determining that the counter value associated with the virtual station is zero. In an embodiment, the channel is accessed for a time duration less than or equal to a pre-determined maximum time duration.

In another embodiment, the method includes determining whether the counter value associated with one or more virtual stations are zero. Further, the method includes accessing the channel by the base station after determining that the counter values associated with the virtual stations are zero. In an embodiment, the channel is accessed for the time duration less than or equal to the pre-determined maximum time duration.

In an embodiment, the base station can use its scheduler to schedule users every time when it accesses and occupies the channel of the unlicensed band.

In an embodiment, whenever the base station occupies the channel then the base station uses the channel by scheduling multiple User Equipments (UEs) downlink transmissions, or channel reservation signal followed by the uplink reception from multiple UEs, or by performing a time division duplexing for both downlink and uplink transmissions in the occupied channel.

In an embodiment, the method includes reinitializing the counter value associated with the virtual station after accessing the channel by the base station.

Further, the method includes updating the contention window of the virtual station when transmission associated with the base station results in either successful or unsuccessful. Further, the method includes selecting a new counter value within the range of the updated contention window. Further, the method includes tracking availability of the channel for a time interval. The availability corresponds to either an idle state or a busy state. Further, the method includes determining that the channel is in the idle state for the time interval. Further, the method includes decrementing the counter value associated with each virtual station after determining that the channel is in the idle state.

In an embodiment, the time interval for the busy state corresponds to a time interval between two idle states.

In an embodiment, the base station determines the channel in an occupied state for the time interval for the busy state or an unoccupied state for the time interval for the idle state for a predetermined time.

In an embodiment, the method includes updating the contention window of each virtual station based on a pre-defined rule when the counter value associated with each virtual station is zero.

In an embodiment, the method includes updating the contention window when the counter value is non-zero within a certain number of observation slots. The observation slot corresponds to the time interval for the busy state or the idle state. In an embodiment, the observation slots are a fixed number or a variable number or indefinite. Further, each virtual station reinitializes the counter value when the counter value is non-zero within the certain number of observation slots.

Unlike conventional systems, the base station can access the channel of the unlicensed band with less interference with other existing stations in the wireless communication network.

Unlike conventional system, the selection of the parameters such as the counter value ($N_i$) can be made equivalent to the random back-off counter and the contention window ($Q_i$) can be made equivalent to the exponential back off; thereby, creating "M" virtual stations (i.e., virtual 802.11 stations) at the base station contending with the regular 802.11 stations (i.e., neighboring stations, Wi-Fi station) in a typical carrier sense multiple access with collision avoidance (CSMA/CA) based 802.11 WLAN. Thus, by maintaining the counter value (N), the proposed mechanism can create opportunities for the base station as if the "M" virtual stations are using wireless local area network(s) (WLAN's) Distributed coordination function (DCF) mechanism.

Unlike conventional systems, the proposed mechanism maintains fairness with other neighboring base stations and the Wi-Fi station in the wireless communication network. As the collisions between the virtual stations maintained at the base station are virtual collisions, the base station occupies the channel even during the time of virtual collisions; thus, resulting in additional gain.

The words "base station" and "eNodeB" are used interchangeably throughout the description.

Referring now to the drawings, and more particularly to FIGS. 2a through 4b, where similar reference characters denote corresponding features consistently throughout the figures, there are shown preferred embodiments.

FIG. 2a illustrates generally, among other things, a high level overview of a wireless communication network 200a for accessing a channel, according to embodiments as disclosed herein. In an embodiment, the wireless communication network 200a includes a base station 202, a neighboring base station 204, a station, and the channel. The base station 202 can be, for example but not limited to a Long Term Evolution (LTE) eNodeB.

In an embodiment, the base station 202 can perform a Clear Channel Assessment (CCA) (i.e., observing the channel for energy) for a fixed pre-determined time duration which is equal to T1. If the observed energy by the base station 202 in the channel is above a threshold, then the channel is assumed to be busy. Further, if the observed energy by the base station 202 is within the threshold, then the channel is assumed to be ideal. In an example, the base station 202 observes the channel for a sufficient time to determine 802.11 wireless LANs (WLANs) DIFS time and use it as the fixed pre-determined time duration T1.

Initially, the base station 202 can be configured to select a value "M". In an embodiment, the value "M" can be selected in the following three ways as described below:
 The value "M" can be set equal to a fixed pre-determined value by regulators.
 The value "M" can be selected randomly from a pre-decided distribution (i.e., uniform distribution) in such a way that the parameters of the distribution are set by the regulators.
 The value "M" can be a function of network parameters such as a packet arrival rate at the base station 202, the number of user equipments (UEs), guaranteed bit rates, or the like.
 The value of "M" can be changed adaptively over time.

Further, after selecting the value "M" by the base station 202, the base station 202 can be configured to maintain a plurality of virtual stations equal to the value "M" selected by the base station 202, such as
 Plurality of virtual stations (VS)=[$VS_1$, $VS_2$, $VS_3$ - - - $VS_M$]

In an example, consider a scenario where the base station 202 selects the value "M" equal to 5 (i.e., M=5). After selecting the value "M", the base station 202 maintains 5 virtual stations in the wireless communication network 200 as shown below:
 Plurality of virtual stations (VS's)=[$VS_1$, $VS_2$, $VS_3$, $VS_4$, $VS_5$].

Further, the base station 202 contends with the neighboring base station 204 and the station to access the channel using the plurality of virtual stations (i.e., $VS_{1-M}$). Each virtual station in the plurality of virtual stations (i.e., $VS_{1-M}$) includes a contention window (Q) and a counter value (N). Further, the base station 202 selects "M" numbers represented by a vector N=[$N_1$, $N_2$, - - - $N_M$], where $N_1$ is the counter value associated with the $VS_1$, $N_2$ is the counter value associated with the $VS_2$, and so on. Each $N_i$, where $i \in \{1, \ldots, M\}$, is selected randomly from [x, $Q_i$] and x is a number greater than or equal to zero $\forall i \in \{1, \ldots, M\}$. The "Q" denotes the vector of length "M" representing Q=[$Q_1$, $Q_2$, $Q_3$ - - - $Q_M$], where the $Q_1$ is the contention window associated with the $VS_1$, $Q_2$ is the contention window associated with the $VS_2$, and so on.

In an embodiment, the $Q_i$ can be initialized by any value from $Q_{Min}$ to $Q_{Max}$, where the $Q_{Min}$ and the $Q_{Max}$ are the design parameters.

In an embodiment, the base station 202 attempts to access the channel by initializing the counter value associated with each virtual station in the plurality of the virtual stations. The counter value is selected based on the contention window. In an embodiment, the base station 202 determines whether the counter value associated with any one of the virtual station is zero. Further, the base station 202 access the channel after determining that the counter value associated with any one of the virtual station is zero. Further, the base station 202 can be configured to access the channel for the time duration less than or equal to the pre-determined maximum time duration.

In another embodiment, the base station 202 determines whether the counter value associated with the one or more virtual stations (for example, the counter value for any two of the virtual stations) are zero. Further, the base station 202 access the channel after determining that the counter value associated with any two of the virtual stations are zero. Further, the base station 202 can be configured to access the channel for the time duration less than or equal to the pre-determined maximum time duration.

In an example, consider a scenario where the base station 202 maintains 5 virtual stations (i.e., $VS_1$, $VS_2$, $VS_3$, $VS_4$, $VS_5$). The counter value $N_1$ and the contention window $Q_1$ is associated with the $VS_1$. The counter value $N_2$ and the contention window $Q_2$ is associated with the $VS_2$. The counter value $N_3$ and the contention window $Q_3$ is associated with the $VS_3$. The counter value $N_4$ and the contention window $Q_4$ is associated with the $VS_4$. The counter value $N_5$ and the contention window $Q_5$ is associated with the $VS_5$. The base station 202 attempts to access the channel 206 by initializing the counter value (i.e., $N_1$, $N_2$, $N_3$, $N_4$, $N_5$) associated with each virtual station (i.e., $VS_1$, $VS_2$, $VS_3$, $VS_4$, $VS_5$).

Further, the base station 202 determines whether the counter value associated with any one of the virtual station is zero or the counter value associated with one or more virtual stations are zero. Further, the base station 202 access the channel after determining that the counter value associated with any one of the virtual station is zero or one or more virtual stations are zero.

Further, the base station 202 reinitializes the counter value associated with the virtual station after accessing the channel by the base station 202.

In an embodiment, the base station 202 updates the contention window of the one or more virtual stations when the transmission associated with the base station 202 is either successful or unsuccessful. Further, the base station 202 selects a new counter value within the range of the updated contention window. Further, the base station 202 tracks the availability of the channel for a time interval. The availability corresponds to either an idle state or a busy state. Further, the base station 202 determines that the channel is in the idle state for the time interval. Further, the base station 202 decrements the counter value associated with each virtual station after determining that the channel is in the idle state. The time interval for the busy state corresponds to a time interval between two idle states. The base station determines the channel in an occupied state for the time interval for the busy state or an unoccupied state for the time interval for the idle state for a predetermined time.

In an embodiment, the base station 202 updates the contention window of each virtual station based on a pre-defined rule when the counter value associated with each virtual station is zero. The base station 202 updates the contention window when the counter value is non-zero within a certain number of observation slots. The observation slot corresponds to the time interval for the busy state or the idle state. The observation slots are the fixed number or the variable number or the indefinite. Further, the base station 202 reinitializes when the counter value is non-zero within the certain number of the observation slots.

In an embodiment, the base station 202 can be configured to include a counter initialization unit (not shown), a controller unit (not shown), and a communication unit (not shown) or any other units performing the functionalities of the base station 202 as described in conjunction with the FIG. 2*a*.

In an embodiment, the functionalities of the base station 202 as described in conjunction with the FIG. 2*a* can be performed by the Wi-Fi station.

The FIG. 2*a* shows a limited overview of the wireless communication network 200*a* but, it is to be understood that other embodiments are not limited thereto. Further, the wireless communication network 200*a* can include any number of base stations along with other hardware or software components communicating with each other. For example, the component can be, but not limited to, a process running in the controller or processor, an object, an executable process, a thread of execution, a program, or a computer. By way of illustration, both an application running on a base station and the base station itself can be a component.

Figure 2B:
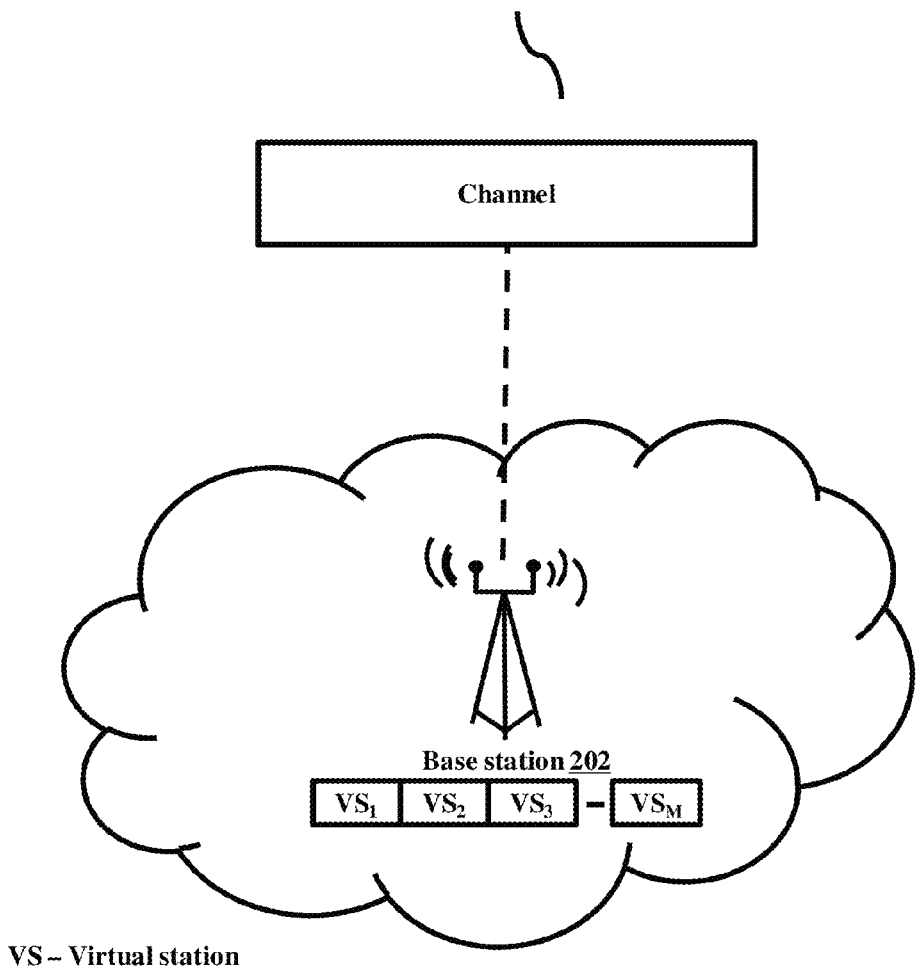
FIG. 2b illustrates another wireless communication network for accessing a channel, according to embodiments as disclosed herein.

FIG. 2*b* illustrates another wireless communication network 200 for accessing a channel, according to embodiments as disclosed herein. In an embodiment, the wireless communication network 200 includes only the base station 202.

The base station 202 contends to access the channel using the plurality of virtual stations. The functionalities of the base station 202 are described in conjunction with the FIG. 2*a*.

The FIG. 2*b* shows a limited overview of the wireless communication network 200*b* but, it is to be understood that other embodiments are not limited thereto. Further, the wireless communication network 200*b* can include any number of base stations along with other hardware or software components communicating with each other. For example, the component can be, but not limited to, a process running in the controller unit or processor unit, an object, an executable process, a thread of execution, a program, or a computer. By way of illustration, both an application running on a base station and the base station itself can be a component.

FIG. 3 is a flow diagram illustrating a method 300 for accessing a channel in the wireless communication network, according to embodiments as disclosed herein. At step 302, the method 300 includes maintaining the plurality of virtual stations by the base station 202 in the wireless communication network based on the value. In an embodiment, the wireless communication network includes the base station 202, the neighboring base station 204, and the station (i.e., Wi-Fi station). In another embodiment, the wireless communication network includes only the base station 202.

At step 304, the method 300 includes contending by the base station 202 to access the channel using the plurality of virtual stations. Each virtual station in the plurality of virtual stations includes the contention window and the counter value. At step 306, the method 300 includes attempting to access the channel by initializing the counter value associated with each virtual station by the base station 202. In an embodiment, attempting to access the channel includes observing the channel for the predetermined time duration denoted by T1, s.t. T1>=0, and if the channel is found idle then initializing the counter value associated with each virtual station by the base station 202. If it is determined, at step 308, that the counter value associated with the one or more virtual stations is zero then, at step 310, the method 300 includes accessing the channel by the base station 202. In an embodiment, the base station 202 is configured to access the channel for the time duration less than or equal to the pre-determined maximum time duration. If it is determined, at step 312, that the transmission is successful then, at step 314, the method 300 includes updating the contention window and attempt to access the channel by initializing the counter value associated with each virtual station. In an embodiment, the contention windows are updated differently when multiple counter values becomes zero or when only one counter value is zero and the transmission is successful or a failure. If it is determined, at step 312, that the transmission is unsuccessful then, at step 314, the method 300 includes updating the contention window.

If it is determined, at step 308, that the counter value associated with the one or more virtual stations is not zero then, at step 316, the method 300 includes tracking availability of the channel for the time interval, where the availability corresponds to the idle state or the busy state. If it is determined, at step 318, that the channel is in idle state for the time period then, at step 320, the method 300 includes decrementing the counter value associated with each virtual station and the step 308 is performed. If it is determined, at step 318, that the channel is not in idle state, then at step 322, the method 300 includes determining number of elapsed observation slots are greater than a predetermined maximum number of observation slots.

If it is determined, at step 322, that the number of elapsed observation slots is greater than the predetermined maximum number of observation slots, then at step 312, the method 300 includes updating the contention window. If it is determined, at step 322, that the number of elapsed observation slots is not greater than the predetermined maximum number of observation slots then, at step 316, the method 300 includes tracking the availability of the channel for the time interval.

The various actions, acts, blocks, steps, and the like in the method 300 may be performed in the order presented, in a different order or simultaneously. Further, in some embodiments, some actions, acts, blocks, steps, and the like may be omitted, added, modified, skipped, and the like without departing from the scope of the invention.

Figure 4A:
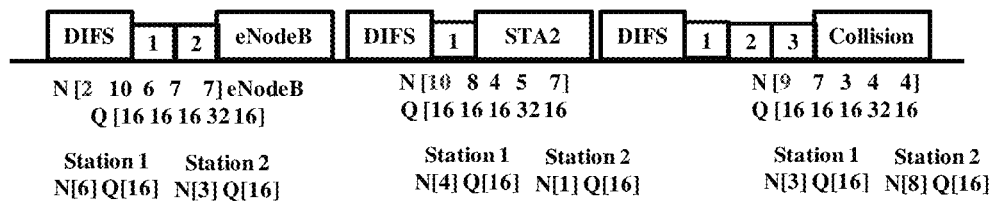
FIG. 4a and FIG. 4b are example illustrations for accessing a channel in the wireless communication network, according to embodiments as disclosed herein.
Figure 4B:
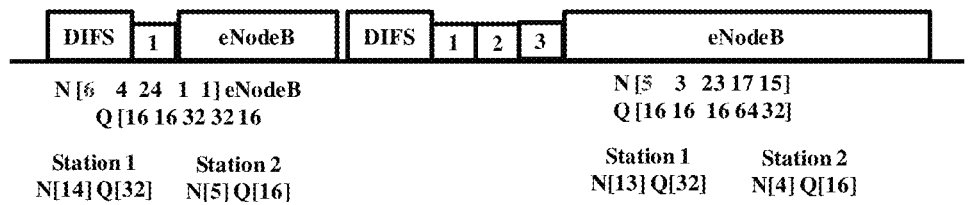

FIG. 4a and FIG. 4b is an example illustration for accessing a channel in the wireless communication network, according to embodiments as disclosed herein. The wireless communication network includes the eNodeB, station 1, and station 2. The station 1 and the station 2 are Wi-Fi stations. Initially, the eNodeB selects the value "M" equal to 5 in the following three ways as described in conjunction with the FIG. 2a, T1 is equal to DIFS time, T2 is equal to WLAN slot time, and two stations (i.e., 802.11 Wi-Fi stations) are connected to the WLAN.

Further, after selecting the value "M" by the eNodeB, the eNodeB maintains 5 virtual stations equal to the value "M". The eNodeB contends with the station 1 and the station 2 to access the channel using 5 virtual stations (i.e., $VS_{1-5}$). Consider "$N_i$" as the back off counter value and "$Q_i$" as the current contention window associated with each virtual station. Further, the back off counter value "$N_i$" and the contention window "$Q_i$" are assigned for the station 1 and the station 2. Every transmission in the WLAN is initiated after waiting for the DIFS time.

Further, as shown in the FIG. 4a, the eNodeB initializes the contention window "Q" for each virtual station as Q=[16 16 16 32 16] where the contention window for each virtual station are $VS_1$=16, $VS_2$=16, $VS_3$=16, $VS_4$=32, and $VS_5$=16. The eNodeB selects the back off counter value N as N=[2 10 6 7 7] where the back off counter value for each virtual station of the eNodeB are $VS_1$=2, $VS_2$=10, $VS_3$=6, $VS_4$=7, and $VS_5$=7 Similarly, the station 1 and the station 2 have their contention window "Q" and the back off counter value "N" initialized as 16, 16, and 6, 3, respectively as shown in the FIG. 4a. The minimum back off counter value is 2 for the $VS_1$.

Further, after two consecutive observation slots (i.e., K=2) in which the channel is observed idle by the eNodeB, the eNodeB determines that the back off counter value associated with the $VS_1$ is zero. The eNodeB occupies the channel and the transmission is successful as no other stations are transmitting at the same time. Thus, the back off counter value of the $VS_1$ is updated with a randomly selected value from Q=[0, 16], which is selected as the value 10 (i.e., $VS_1$=10) as shown in the FIG. 4a.

Further, the minimum back off counter value associated with the $VS_3$ maintained by the eNodeB is 4. After one observation slot (i.e., K=1), the channel is busy as the station 2 access the channel because the back off counter value associated with the station 2 is zero. Thus, the back off counter values associated with each virtual station maintained by the eNodeB is not changed until the channel becomes idle. After determining that the channel is idle by the eNodeB, the minimum value of the back off counter value associated with the $VS_3$ is 3. Further, the eNodeB occupies the channel after three consecutive idle observation slots. However, the transmission is unsuccessful due to the collision (i.e., physical collision between the $VS_3$ and the station 1) with the station 1 because the back off counter value associated with the station 1 is also zero.

Further, the contention window of the $VS_3$ which was 16 is increased to 32 as shown in the FIG. 4b. The eNodeB selects the suitable back off counter value of the $VS_3$ to 24 which is randomly selected from [0, 32] as shown in the FIG. 4b. After the DIFS time, the back off counter values associated with the $VS_4$ and the $VS_5$ are equal to 1. Further, after one observation slot, the eNodeB occupies the channel and updates the contention window associated with the $VS_4$ from 32 to 64 as shown in the FIG. 4b. Also, updates the contention window associated with the $VS_5$ from 16 to 32. Now, the back off counter values for the $VS_4$ and the $VS_5$ are randomly selected within the range of [0, 64] and [0, 32] where the back off counter value for the $VS_4$ is equal to 17 and the back off counter value for the $VS_5$ is equal to 15 respectively as shown in the FIG. 4b. After the DIFS time, the minimum back off counter value is associated with the $VS_2$ is 3 so the eNodeB occupies the channel after the three observation slots.

The embodiments disclosed herein can be implemented through at least one software program running on at least one hardware device and performing network management functions to control the elements. The elements shown in FIGS. 2a and 2b include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method implemented in a base station, the method comprises:
    maintaining a plurality of virtual stations by said base station in a wireless communication network based on a value, wherein said wireless communication network comprises at least one of: said base station, a neighboring base station, and a Wi-Fi station;
    contending to access a channel using said plurality of virtual stations, wherein each said virtual station in said plurality of virtual stations comprises a contention window and a counter value;
    updating said contention window of at least one said virtual station when transmission associated with said base station results in one of: successful, and unsuccessful; and
    selecting a counter value within range of said updated contention window for accessing the channel.

2. The method of claim 1, wherein said method further comprises:
    attempting to access said channel by initializing said counter value associated with each said virtual station;
    determining whether said counter value associated with at least one said virtual station is zero, wherein said counter value is selected based on said contention window; and
    accessing said channel in response to determining that said counter value associated with at least one said virtual station is zero.

3. The method of claim 2, wherein said channel is accessed for a time duration less than or equal to a pre-defined maximum time duration.

4. The method of claim 2, wherein said method further comprises:
reinitializing said counter value associated with said virtual station.

5. The method of claim 4, wherein said method further comprises:
tracking availability of said channel for a time interval, wherein said availability corresponds to one of: an idle state and a busy state;
determining that said channel is in said idle state for said time interval; and
decrementing said counter value associated with each said virtual station in response to determining that said channel is in said idle state.

6. The method of claim 5, wherein said time interval for said busy state corresponds to a time interval between two idle states, wherein said base station determines said channel in one of: an occupied state for said time interval for said busy state and an unoccupied state for said time interval for said idle state for a predetermined time.

7. The method of claim 1, wherein said method further comprises updating said contention window of each said virtual station based on a pre-defined rule when said counter value associated with each said virtual station is zero.

8. The method of claim 1, wherein said method further comprises updating said contention window when said counter value is non-zero within a certain number of observation slots, wherein said observation slot corresponds to said time interval for one of a busy state and an idle state.

9. The method of claim 8, wherein said observation slots are at least one of a fixed number, a variable number, and indefinite.

10. The method of claim 8, wherein each said virtual station reinitializes said counter value when said counter value is non-zero within said certain number of said observation slots.

11. A base station for accessing a channel, wherein said base station comprises a processor configured to:
maintain a plurality of virtual stations by said base station in a wireless communication network based on a value, wherein said wireless communication network comprises at least one of: said base station, a neighboring base station, and a Wi-Fi station;
contend to access said channel using said plurality of virtual stations, wherein each said virtual station in said plurality of virtual stations comprises a contention window and a counter value;
update said contention window of at least one said virtual station when transmission associated with said base station results in one of: successful, and unsuccessful; and
select a counter value within range of said updated contention window for accessing the channel.

12. The base station of claim 11, wherein said processor is further configured to:
attempt to access said channel by initializing said counter value associated with each said virtual station;
determine whether said counter value associated with at least one said virtual station is zero, wherein said counter value is selected based on said contention window; and
access said channel in response to determining that said counter value associated with at least one said virtual station is zero.

13. The base station of claim 12, wherein said channel is accessed for a time duration less than or equal to a predetermined maximum time duration.

14. The base station of claim 12, wherein said processor is further configured to:
reinitialize said counter value associated with said virtual station.

15. The base station of claim 14, wherein said processor is further configured to:
track availability of said channel for a time interval, wherein said availability corresponds to one of: an idle state and a busy state;
determine that said channel is in said idle state for a time interval; and
decrement said counter value associated with each said virtual station in response to determining that said channel is in said idle state.

16. The base station of claim 15, wherein said time interval for said busy state corresponds to a time interval between two idle states, wherein said processor determines said channel in one of: an occupied state for said time interval for said busy state, and an unoccupied state for said time interval for said idle state for a predetermined time.

17. The base station of claim 11, wherein said processor is further configured to update said contention window of each said virtual station based on a pre-defined rule when plurality of said counter values associated with each said virtual stations are zero.

18. The base station of claim 11, wherein said processor is further configured to update said contention window when said counter value is non-zero within a certain number of observation slots, wherein said observation slot corresponds to said time interval for one of a busy state and an idle state.

19. The base station of claim 18, wherein said observation slots are at least one of a fixed number, a variable number, and indefinite.

20. The base station of claim 18, wherein each said virtual station reinitializes when said counter value is non-zero within said certain number of said observation slots.

* * * * *